Aug. 4, 1959  R. R. CARLTON  2,897,856
SAW BAR WITH NOSE INSERT
Filed Feb. 24, 1956  2 Sheets-Sheet 1
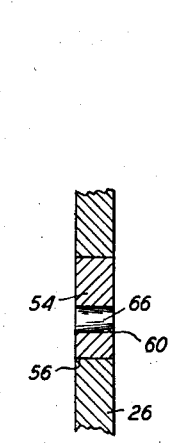
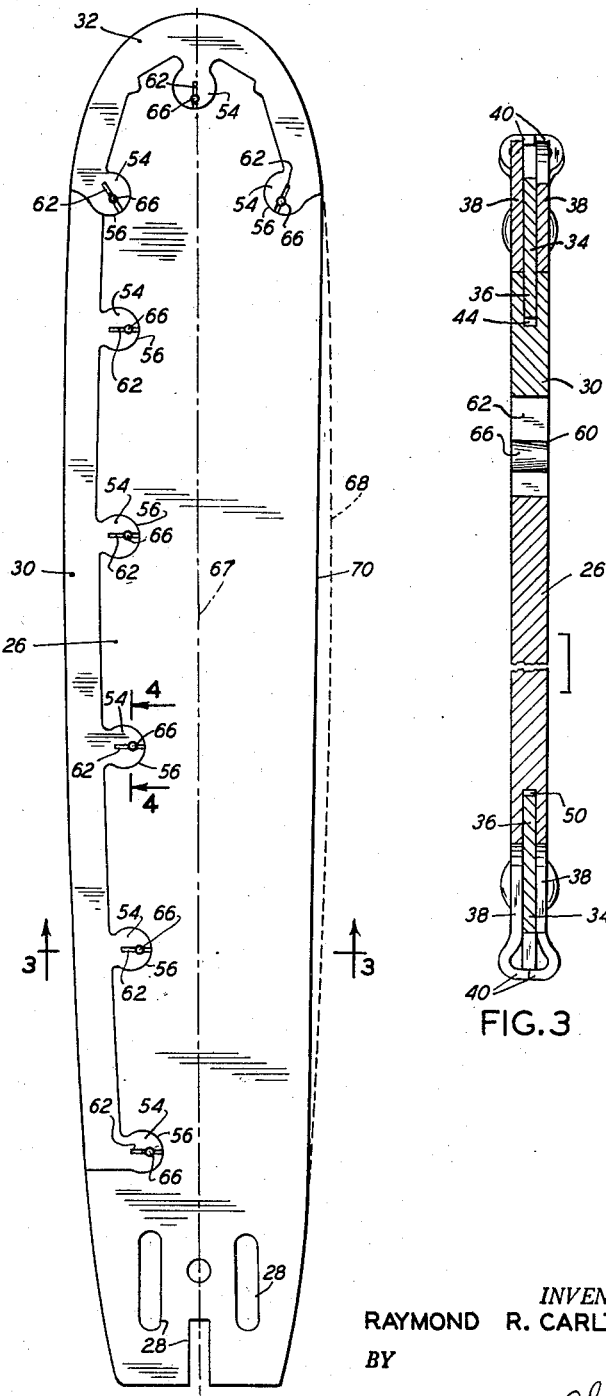
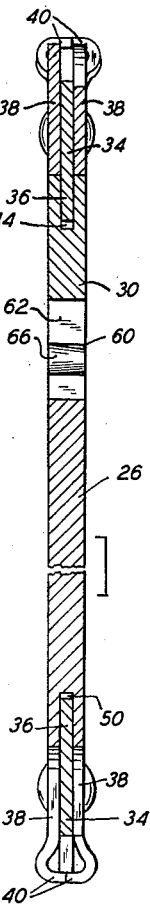
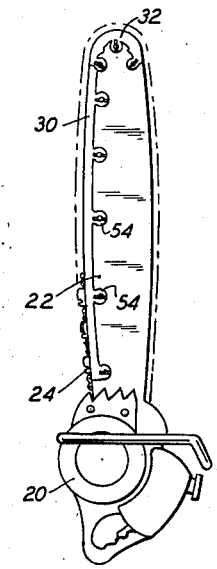
INVENTOR.
RAYMOND R. CARLTON
BY
Buckhorn and Cheatham
ATTORNEYS Aug. 4, 1959   R. R. CARLTON   2,897,856
SAW BAR WITH NOSE INSERT
Filed Feb. 24, 1956   2 Sheets-Sheet 2
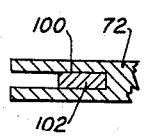
FIG. 6
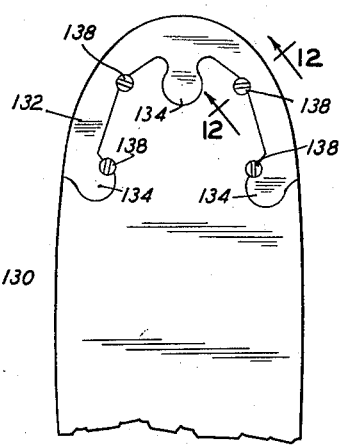
FIG. 11
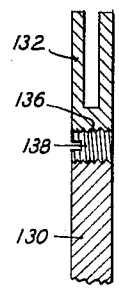
FIG. 12
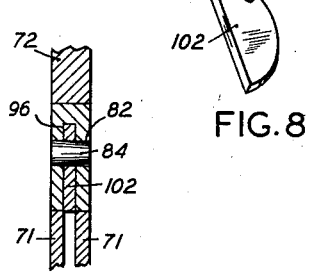
FIG. 7
FIG. 8
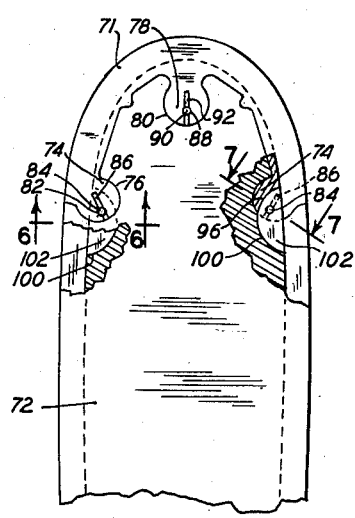
FIG. 5
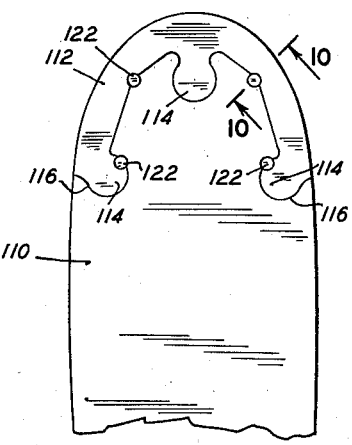
FIG. 9
FIG. 10
*INVENTOR.*
RAYMOND R. CARLTON
BY
Buckhorn and Cheatham
ATTORNEYS United States Patent Office 2,897,856
Patented Aug. 4, 1959

2,897,856

SAW BAR WITH NOSE INSERT

Raymond R. Carlton, Portland, Oreg., assignor to Omark Industries, Inc., a corporation of Oregon Application February 24, 1956, Serial No. 567,611

11 Claims. (Cl. 143—32)

The present invention relates to chain saws and more particularly to a new and improved construction of a saw bar for a chain saw.

Heretofore chain-saw saw bars have generally been formed from a single, flat metal plate, the periphery of which is formed to provide a guide track for the saw chain. Unfortunately, metals having the strength and flexibility suitable for forming the general body of the saw bar are not resistant to the abrasion of the saw chain as it moves around the periphery of the bar, and consequently a solid metal saw bar wears rapidly and must be removed from service frequently so that the edges of the bar may be re-shaped. Because the rounded nose of the saw bar receives the greatest amount of wear, it has been the practice in some instances to weld a piece of hard metal to the nose of the saw bar. However, even the hard metal piece will wear away and require re-shaping at rather frequent intervals. The re-shaping operations are costly and if the chain saw is to be kept in operation, a substitute bar must be used which, of course, requires an investment of additional money to purchase such new bar.

It is an object of the present invention to provide a new and improved saw bar construction that will enable substantially continuous use of a saw bar.

More particularly, it is an object of the present invention to provide a saw bar having inserts of hard, wear resistant metal removably mounted on the periphery of the saw bar in such fashion that they may be quickly replaced with new inserts as they become worn so as not to require a saw bar to be taken out of service.

It is another object of the invention to make possible the construction of saw bars of lighter weight than heretofore.

Other objects and advantages of the invention will become more apparent hereinafter.

In accordance with an illustrated embodiment, the saw bar of the invention comprises a flat metal base member having inserts of hard, wear resisting metal removably attached to the periphery of the base member, the inserts defining a track for the saw chain mounted on the saw bar. As the inserts become worn, they may be easily and quickly replaced with new inserts to permit substantially continuous operation of the saw bar.

For a more detailed description of the invention, reference is made to the accompanying drawings and the following specification.

In the drawings,

Fig. 1 is a side elevational view of a chain saw having a saw bar mounted thereon;

Fig. 2 is an enlarged plan view of a saw bar constructed in accordance with the invention;

Fig. 3 is an enlarged, cross sectional view of a saw bar taken substantially along line 3—3 of Fig. 2 and showing a saw chain mounted on the bar;

Fig. 4 is an enlarged, sectional view taken along line 4—4 of Fig. 2;

Fig. 5 is a fragmentary plan view showing a modified arrangement for attaching an insert to the base member of a saw bar, certain parts being broken away to show details of the arrangement;

Fig. 6 is an enlarged, sectional view taken along line 6—6 of Fig. 5;

Fig. 7 is an enlarged sectional view taken along line 7—7 of Fig. 5;

Fig. 8 is a perspective view of a key used in the embodiment of Fig. 5;

Fig. 9 is a fragmentary plan view of a saw bar showing still another arrangement for securing an insert thereto;

Fig. 10 is an enlarged, cross sectional view taken along line 10—10 of Fig. 9;

Fig. 11 is a fragmentary plan view of a saw bar showing still another arrangement for attaching an insert to a saw bar; and Fig. 12 is an enlarged, sectional view taken along line 12—12 of Fig. 11.

The environment of the invention may be best understood by referring first to Fig. 1 wherein is shown a chain saw including a motor 20 having a saw bar 22 attached thereto for supporting a saw chain indicated generally at 24. With reference next to Figs. 2, 3 and 4, a saw bar such as shown at 22 above and made in accordance with the invention comprises a flat, parallel sided, elongate bladelike base member 26 formed of metal having suitable strength and flexibility and having means at one end such as slots and apertures indicated generally at 28 for attaching the member to the chain saw motor 20. Mounted along one of the longitudinal edges of the member 26 is a replaceable rail or insert 30 formed of a hard, wear resistant metal. The insert 30 abuts and merges with a nose piece or insert 32 which extends around the nose of the bar and is also formed of hard, wear resistant metal. The inserts 30, 32 are preferably formed with flat, parallel sides and preferably are of the same thickness as the base member 26. The saw bar 22 is illustrated as constructed for supporting a saw chain of the type having center links 34 formed with a tab or root 36, the center links being pivotally connected together by opposite side plates 38. Thus, as shown in Fig. 3, the inserts 30, 32 are each formed with a slot or groove 44 in which the center roots 36 are received, the opposite side plates 38 being adapted to ride upon the periphery of the inserts on the opposite sides of the groove 44. The chain supporting periphery of the base member 26 is likewise provided with a tab receiving groove indicated at 50, in Fig. 3. The chain may be of the type such as shown in the Cox Patent 2,508,784, and in which some of the side plates are formed with allochiral cutting teeth 40 but, as will be apparent, the cutting teeth may be provided upon the center links 34.

The inserts 30, 32 are attached to the base member 26 by means of projections 54 extending from the inner edge of the inserts and formed with enlarged, substantially circular heads which are snugly and cooperatively received in similarly shaped apertures 56 formed in the base member 26. The walls defining the projections 54 and the apertures 56 preferably are perpendicular to the planes of the sides of the saw bar, whereby the inserts may be mounted on or removed from the base member 26 by relative movement between the inserts and base member at right angles to the sides of the base member and inserts.

Means are provided to prevent accidental movement of the inserts relative to the base member 26. Each of the projections 54 is formed with a transverse opening 60 at the center thereof and with a slot 62 extending through the opening from one edge of the projection. Each of the projections 54 is expanded into tight engagement with the walls of the corresponding aperture 56 by a wedge or tapered pin 66 driven into the opening 60 of the projection. If an insert is to be removed from the base member 26, the pins 66 are driven out of the openings 60 whereafter the insert may be removed from the bar and the new insert mounted thereon.

Certain of the advantages of utilizing the hard, wear resistant inserts 30, 32 will be immediately obvious. As has been mentioned hereinbefore, it has been the practice heretofore to weld a hard metal nose on a saw bar to compensate for the additional wear which occurs at that point. However, even welded hard metal noses wear down relatively rapidly and it is necessary to re-work such a nose either by grinding out the bottom of the center link receiving groove to deepen the groove, or by welding hard surfacing material to the rails defining the groove to rebuild the rails to their original height. Either of these procedures is quite expensive and, of course, the saw bar must be taken out of operation for this maintenance work. However, if a replaceable insert is used such as in the arrangement just described, a new insert can be quickly installed in the event that an insert becomes unduly worn and the saw bar put back into operation almost immediately. A worn insert can be re-worked, if desired, after it has been removed from a saw bar.

An unusual advantage flowing from the use of the elongate side rail or insert 30 is that it permits re-shaping of a saw bar from its conventional shape to reduce the overall weight of the bar. This is best explained with reference to Fig. 2. It has been found that for the most efficient operation of a chain saw, the longitudinal edge of the saw bar which supports the cutting teeth engaged in the kerf of the work piece being cut should be bowed in outline similarly to the bow in the outer edge of the side rail 30. In the conventional, solid piece saw bars of the prior art, both of the opposite longitudinal edges of the saw bar are bowed so that the saw bar is symmetrical about a longitudinal center line indicated at 67, the longitudinal edge of the bar opposite that of the bar rail 30, as would be present in a conventional bar, being indicated by a dotted line 68. The symmetrical shape is provided so that the saw bar can be reversed as wear occurs on one longitudinal edge, thus prolonging the working life of the saw bar.

However, with the provision of the hard metal rail 30, it is not necessary that a saw bar be provided with the oppositely bowed longitudinal edge portions since the hard rail 30 will, in the first instance, have a much longer life than an ordinary saw bar and, if it should become worn, can easily and quickly be replaced with a new insert. Consequently, the edge of the bar opposite the insert 30, that is the edge indicated at 70 in Fig. 2, can be extended in a straight line from the nose of the saw bar to the opposite end, thus eliminating the weight of the additional material that would be used in the shape of the conventional saw bar.

An alternative arrangement for securing an insert to a saw bar is shown in Figs. 5 to 8, inclusive. Referring first to Fig. 5, an insert 71 is shown mounted on the nose of a saw bar base member 72, the insert having circular headed projections 74 at its opposite ends received in cooperative apertures 76 formed in the saw bar base member 72 and a further circular headed projection 78 at its center fitted in a base member aperture 80. Each of the projections 74 is provided with an opening 82 for receiving a tapered pin 84 and with a slot 86 extending through the opening 82 thereof. The projection 78 is likewise formed with an opening 88 for receiving a pin 90, the projection being provided with a slot 92 to permit its expansion upon driving home of the pin. The projections 74 are each bifurcated to define a keyway 96 medially between and extending parallel to the opposite sides of the insert 71, and the base member 72 is provided with a pair of keyways 100 which mate with the keyways of the corresponding projections. As indicated in Fig. 5, the mated keyways are each semi-circular in outline for receiving a semi-circular key 102, best shown in Fig. 8. Each of the keys 102 is formed with an aperture 104 for receiving the pin 84 driven through the projection in which the key is fitted. The pins 84 hold the keys 102 in position and the keys in turn prevent lateral movement between the insert and the base member 72. To replace the insert 71, the pins 84 are driven out and the keys 102 rotated to displace them from the keyways; thereafter the old insert can be removed and a new insert mounted on the saw bar, and the keys and pins replaced.

Other arrangements for securing an insert in place on the saw bar are illustrated in Figs. 9 and 12, inclusive, Figs. 9 and 10 illustrating one arrangement and Figs. 11 and 12 a different arrangement. However, it will be noted from the ensuing description that these two arrangements have features in common. Essentially, these arrangements comprise the provision of a laterally extending opening between the mating edges of the base member of the saw bar and the insert piece, the opening being defined by notches in the mating edges having formations defining shoulders. In each instance a fastener element is inserted having means to engage the shoulders and to hold the insert in position on the base member.

Referring first to Figs. 9 and 10, there is illustrated the nose end of a saw bar base member 110 having an insert 112 mounted thereon. The insert is formed with headed projections 114 which engage in cooperative apertures 116 formed in the base member. Formed between the mating edges of the base member 110 and the insert 112 are a plurality of opposing notches defining laterally extending openings 118 which are flared at their opposite ends as indicated at 120. Extending through the openings 118 are rivets 122 which are expanded into the flared ends 120 of the openings, as best shown in Fig. 10, to define flanges or shoulders 124 engaging the base member 110 and insert 112 to hold the same in relatively fixed position.

Referring next to Figs. 11 and 12, there is shown therein the nose end of a saw bar base member 130 having an insert 132 mounted thereon, the insert having headed projections 134 fitting in cooperative apertures formed in the base member 130. A plurality of laterally extending, threaded openings 136 are formed between the mating edges of the base member 130 and insert 132, the openings 136 being defined by opposing notches in the mating edges. Threaded elements or screws 138 are installed in the openings 136 to secure the insert against lateral displacement.

In the foregoing description, the invention has been described with reference to certain particular, preferred embodiments, but it is to be understood that such embodiments are merely illustrative and that the invention may be carried out in other ways without departing from the true spirit and scope of the invention.

I claim:

1. A chain-saw saw bar comprising a flat, parallel sided base member of elongate configuration having means on one end for attaching the member to a chain saw motor, an insert attached to said base member at the end thereof opposite the first mentioned end and defining a rounded nose and saw chain guide, said insert having a plurality of integral projections each formed with an enlarged head and a plurality of complementary apertures in said base member cooperatively receiving and snugly engaging said projections, said projections and said apertures being defined by walls extending at right angles to said parallel sides whereby said insert may be mounted or detached from said base member by relative movement between said member and said insert in a direction at right angles to the plane of said sides, and means securing said inserts and member against accidental separative movement.

2. A chain-saw saw bar comprising a flat, parallel sided, blade like metal base member of elongate configuration having means on one end for attaching the member to a chain saw motor, a first parallel sided replaceable insert of hard, wear resisting metal attached to said base member along one longitudinal edge of said member and defining a guide for a saw chain, a second parallel sided insert of hard, wear resisting metal attached to said base member at the end thereof opposite the first mentioned end and defining a rounded nose and saw chain guide, a plurality of integral projections on each of said inserts having enlarged heads and narrower connecting necks, said base member having a plurality of complementary apertures cooperatively receiving said projections, said projections and said apertures being defined by walls extending at right angles to said parallel sides so that said inserts may be positioned on and is removable from said base member by relative movement between said member and said inserts in a direction at right angles to the plane of said sides, and means for holding said insert member on said base member with said projections in said apertures against removal by movement in said direction.

3. A chain-saw saw bar comprising a flat blade like base member of elongate configuration having means on one end for attaching the member to a chain saw motor, a replaceable insert of hard, wear resisting metal attached to said base member along an edge portion of said member and defining a guide for a saw chain, said insert having a plurality of integral projections formed with enlarged, generally circular heads and narrower connecting necks and a plurality of complementary apertures in said base member cooperatively receiving and snugly engaging said projections so that said insert may be positioned on and is removable from said base member by relative movement therebetween in a direction normal to the plane of said base member, said projection heads each having an elongate slot formed therein whereby said heads may be expanded, and wedge means engaged in each of said slots and expanding said heads into tight engagement with the walls of the corresponding aperture for holding said insert with said projection in said aperture against removal by movement in said direction.

4. A chain-saw saw bar comprising a flat, parallel sided base member and a parallel sided insert of hard, wear resisting material removably secured to a longitudinal edge portion of said member, said insert having an outer edge defining a saw chain guide track and an inner edge having a projection formed with an enlarged head, said base member having a cooperatively shaped opening therein receiving said projections, said projection having a keyway formed therein medially between and extending parallel to the opposite sides of said insert, said base member having a keyway formed therein medially between and extending parallel to the opposite sides thereof and mating with said projection keyway, and a key fitting in said keyways to prevent lateral movement between said insert and base member.

5. A chain-saw saw bar comprising a flat, parallel sided base member and a parallel sided insert of hard, wear resisting material removably secured to a longitudinal edge portion of said member, said insert having an outer edge defining a saw chain guide track and an inner edge having a projection formed with an enlarged head, said base member having a cooperatively shaped opening therein receiving said projection, said projection having a keyway formed therein medially between and extending parallel to the opposite sides of said insert, said base member having a keyway formed therein medially between and extending parallel to the opposite sides thereof and mating with said projection keyway, a key fitting in said keyways to prevent lateral movement between said insert and base member, and a pin fitted in an opening through one of the portions of said projection defining the keyways therein and in an aligned opening in said key to lock said key in place.

6. A chain-saw saw bar comprising a flat, parallel sided blade like base member of elongate configuration having means on one end for attaching the member to a chain saw motor, a replaceable insert of hard, wear resisting metal attached to said base member at the end thereof opposite the first mentioned end and defining a rounded nose and having an outer edge defining a track for a saw chain, said insert having an inner edge defining a plurality of integral projections each formed with an enlarged head and narrower connecting necks, and a plurality of complementary apertures in said base member cooperatively receiving and snugly engaging said projections, said projections and said apertures being defined by walls extending at right angles to said parallel sides whereby said insert may be positioned on and is removable from said base member by relative movement between said member and said insert in a direction at right angles to the plane of said sides, and means for holding said insert on said base member with said projection in said apertures against removal by movement in said direction.

7. A chain-saw saw bar comprising a blade like base member, a replaceable insert of hard, wear resisting metal mounted on an edge of said member, said insert having an outer edge defining a track for a saw chain and an inner edge defining an integral projection formed with an enlarged head and a narrower connecting neck, said base member having a complementary aperture cooperatively receiving and engaging said projection so that said insert may be positioned on and is removable from said base member by relative movement therebetween in a direction normal to the plane of said base member and means for holding said insert on said base member with said projection in said aperture against removal by movement in said direction.

8. A chain-saw saw bar as set forth in claim 7 wherein said means for holding said insert against removal by movement in said direction comprise a laterally extending opening between the mating edges of said member and said insert defined by opposing notches in said mating edges, said notches having formations defining shoulders, and a fastener element in said opening and having means engaging said shoulders.

9. A chain-saw saw bar as set forth in claim 7 wherein said means for holding said insert against removal by movement in said direction comprise a laterally extending opening between the mating edges of said member and said insert defined by opposing notches in said mating edges, said opening being flared at its opposite ends, and a rivet extending through said opening and being expanded into each of the flared ends of said opening whereby to define shoulders engaging said base member and said insert.

10. A chain-saw saw bar as set forth in claim 7 wherein said means for holding said insert against removal by movement in said direction comprise a threaded laterally extending opening between the mating edges of said member and said insert defined by opposing notches in said mating edges, and a threaded element screwed into said opening.

11. A chain-saw saw bar as set forth in claim 7 wherein said means for holding said insert against removal by movement in said direction comprise a threaded member screwed into a cooperatively threaded opening defined by opposing, semicylindrical notches in the mating edges of said base member and said insert.

References Cited in the file of this patent

UNITED STATES PATENTS

| | | |
|---|---|---|
| 869,659 | Schubert | Oct. 29, 1907 |
| 1,254,328 | Kanall | Jan. 22, 1918 |
| 2,638,944 | Woleslagle | May 19, 1953 |

FOREIGN PATENTS

| | | |
|---|---|---|
| 213,969 | Switzerland | June 16, 1941 |